US007320260B2

(12) United States Patent
Belgardt

(10) Patent No.: US 7,320,260 B2
(45) **Date of Patent: *Jan. 22, 2008**

(54) PIPETTING DEVICE WITH A DISPLACEMENT DEVICE AND A DRIVE DEVICE RELEASABLY CONNECTED THEREWITH

(75) Inventor: Herbert Belgardt, Hamburg (DE)

(73) Assignee: Eppendorf AG, Hamburg (DE)

( * ) Notice: Subject to any disclaimer, the term of this patent is extended or adjusted under 35 U.S.C. 154(b) by 252 days.

This patent is subject to a terminal disclaimer.

(21) Appl. No.: 11/038,799

(22) Filed: Jan. 20, 2005

(65) Prior Publication Data

US 2005/0155438 A1 Jul. 21, 2005

(30) Foreign Application Priority Data

Jan. 21, 2004 (DE) ..................... 10 2004 003 434

(51) Int. Cl.
*G01N 1/00* (2006.01)

(52) U.S. Cl. .................................................. 73/864.14

(58) Field of Classification Search ............. 73/864.14, 73/864.13, 864.16, 864.17, 864.18; 422/100
See application file for complete search history.

(56) References Cited

U.S. PATENT DOCUMENTS

| | | | | |
|---|---|---|---|---|
| 3,977,574 A | | 8/1976 | Thomas | 222/391 |
| 4,154,108 A | * | 5/1979 | Vollinger et al. | 73/864.13 |
| 5,021,217 A | * | 6/1991 | Oshikubo | 422/100 |
| 5,104,624 A | * | 4/1992 | Labriola | 422/100 |
| 5,700,959 A | * | 12/1997 | Homberg | 73/864.16 |
| 6,428,750 B1 | * | 8/2002 | Rainin et al. | 422/100 |
| 6,499,363 B1 | * | 12/2002 | Shigematsu et al. | 73/864.01 |

FOREIGN PATENT DOCUMENTS

| | | |
|---|---|---|
| DE | 2017119 | 10/1971 |
| DE | 2711124 | 9/1978 |
| EP | 0428500 | 2/1985 |
| EP | 0250243 | 12/1987 |
| EP | 0801309 | 10/1997 |
| EP | 0992288 | 4/2000 |
| GB | 2161398 | 1/1986 |
| WO | 02/16036 | 2/2002 |
| WO | 02/089983 | 11/2002 |

* cited by examiner

*Primary Examiner*—Robert Raevis
(74) *Attorney, Agent, or Firm*—Vidas, Arrett, Steinkraus

(57) ABSTRACT

Pipetting device with a displacement device with a displacement chamber with a displaceable limiter, a attachment for connecting to a pipette tip and a connecting channel between the displacement chamber and the free end of the attachment, a drive device for driving the displaceable limiter of the displacement device with a drive member, which has a releasable cooperation with the displaceable limiter, and a bayonet connection between the drive device and the displacement device which can be established by creating the cooperation between the drive member and the displaceable limiter and can be released by releasing the cooperation between the drive member and the displaceable limiter.

19 Claims, 1 Drawing Sheet

PIPETTING DEVICE WITH A DISPLACEMENT DEVICE AND A DRIVE DEVICE RELEASABLY CONNECTED THEREWITH

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Pipetting devices are in particular used in the laboratory for metering liquids. They are drawn into pipette tips through a tip orifice and dispensed. With air cushion pipettes a displacement device for a gas is incorporated in the pipetting device and communicatingly connected to the pipette tip by the attachment. An air cushion is displaced by means of the displacement device, so that liquid is suctioned into the pipette tip and ejected therefrom. The displacement device is generally a cylinder with a piston which can be displaced therein.

The pipette tips are releasably connected to the attachment, so that they can be exchanged after use for a fresh pipette tip. As a result contamination can be avoided during subsequent metering. Single use pipette tips are available cheaply, made from plastics.

The attachment for fastening pipette tips is frequently a cylindrical or conical projection relative to a base body or a housing, and onto which a pipette tip with a suitable mounting opening or receiver can be clamped. This can take place without grasping the pipette tip by pressing the attachment into the mounting opening of the pipette tip which is ready in a holder.

To avoid contamination of the user, pipette devices comprise an ejection device with a drive device and a throw-off device. By actuating the drive device the throw-off device is displaced, such that it releases the pipette tip from the attachment, without it having to be grasped by the user. Frequently, the drive device has a mechanism which has to be manually actuated by means of an actuation button, in order to release the pipette tip from the attachment. Drive devices are also possible with an electromotive drive. Releasing the pipette tip from the attachment can require increased operating force, in particular with pipette tips which are rigidly clamped onto the attachment. Even with one-channel systems, ie pipetting devices which comprise a single attachment for a single pipette tip, this can make ejecting the pipette tip from the attachment difficult or impossible. Particularly high operating force can be required with multi-channel pipette systems which have a plurality of parallel attachments for mounting pipette tips, due to multiple tip ejection forces.

A pipette system with an axially movable throw-off device for releasing a pipette tip from an attachment, a drive device to drive the axial movements of the throw-off device and a pull-means gear, push-means gear or linkage gear transferring an axial drive movement of the drive device into an axial movement of the throw-off device is known from EP 0 992 288 A2. The force exerted by the throw-off device on the pipette tip exceeds the force exerted by the user, whereby the ejection is facilitated.

Air cushion pipettes can lead to contamination of the displacement device. Penetration of fluid due to improper handling or the rising of vapour or tiny droplets of the liquid to be pipetted into the displacement device can result therefrom. Moreover, it can be desirable to exchange the displacement device in order to prepare the pipetting device for use in a further area of the volume of liquids to be pipetted.

Pipetting devices are already known in which the displacement device with the attachment for mounting the pipette tip can be separated from a drive device to drive the displacement device. In EP 0 428 500 B1 such a pipetting device is disclosed in which the displacement device can be screwed onto a shank of the drive device by means of a coupling nut. In principle, it is therefore possible to release the displacement device for cleaning or for exchanging the drive device. The fastening is nevertheless laborious, time-consuming and susceptible to faults.

Proceeding from this, the object of the invention is to provide a pipetting device in which the displacement device and the drive device can be more easily and more rapidly connected to and separated from one another and in which the connection is less susceptible to faults.

The object is achieved by a pipetting device with the features of claim 1. Advantageous embodiments of the pipetting device are revealed in the sub-claims.

BRIEF SUMMARY OF THE INVENTION

The pipetting device according to the invention has a displacement device with a displacement chamber with a displaceable limiter, an attachment for connecting to a pipette tip and a connection channel between the displacement chamber and the free end of the attachment, a drive device for driving the displaceable limiter of the displacement device with a drive member which cooperates releasably with the displaceable limiter, and a bayonet connection between the drive device and the displacement device which can be established by producing the cooperation between the drive member and the displaceable limiter and can be released by releasing the cooperation between the drive member and the displaceable limiter.

The displacement device and the drive device of the pipetting device can be easily connected to one another by being pushed together along a longitudinal axis of the bayonet connection and rotating about the longitudinal axis of the bayonet connection and can be separated from one another in the reverse manner. When establishing the bayonet connection the cooperation between the drive member and the displaceable limiter is simultaneously produced without it requiring further particular actions therefor. When releasing the bayonet connection, the cooperation is released without particular further actions. The invention allows a particularly simple, rapid and secure connection and separation of the displacement device and the drive device, for example during assembly, before autoclaving or other cleaning of the lower part, before exchanging the lower part for the purpose of altering the working area, repairs, etc. The bayonet connection is not particularly susceptible to faults. These advantages are in particular effective when manually and automatically connecting and separating the displacement device and the drive device. The latter, for example, with automatic assembly or a workstation with automatic tool exchange.

The drive device can be designed in different ways. It makes use of technical means to displace the drive member, such that it displaces the displaceable limiter of the displacement device. To this end, the drive member carries out, for example, a linear movement. Accordingly, the drive device comprises a linear drive. In this connection there is, for example, a lifting rod which can be manually actuated directly by actuating a button or a lifting rod which is linearly displaceable via an electric drive motor and a gear mechanism. A pneumatically or hydraulically operated pressure medium cylinder can also be considered as the drive for the lifting rod which is actuated via a pneumatic or hydraulic control mechanism and a pressure medium reservoir. If the drive member does not carry out a linear movement but a three-dimensional feed motion, the drive device comprises a corresponding drive.

The drive device preferably comprises a housing in which the drive and the drive member are arranged. According to an embodiment, the drive member is a lifting rod of the drive device, displaceable parallel to the longitudinal axis of the bayonet connection and the displacement device comprises a contact surface connected to the limiter, oriented transversely to the lifting rod and which is pressed by a lift spring against the end of the lifting rod. In this embodiment the cooperation between the drive member and the displaceable limiter is automatically produced when the bayonet connection is established and automatically released when the bayonet connection is released.

According to an embodiment the contact surface is constructed on a pressure piece connected to the displaceable limiter via a rod and the lift spring is designed as a coil spring which at one end is supported on the pressure piece and at the other end on the displacement chamber.

The bayonet connection can be designed in different ways. Included in the invention in particular is the design of the drive device as a male part and the displacement device as a female part of the bayonet connection and vice versa. According to an embodiment the drive device has a cylindrical receiver which comprises an aperture at one end through which the cylindrical receiver is externally accessible in the axial direction which comprises at least one axially oriented longitudinal groove which is connected to an annular groove oriented in the peripheral direction of the cylindrical receiver and the displacement device on a cylindrical portion comprises at least one outwardly protruding projection, the cylindrical portion able to be inserted in the axial direction of the cylindrical receiver through the aperture into the receiver and with the projection into the longitudinal groove and can be screwed with the projection into the annular groove. In this embodiment the drive device is the female part and the displacement device the male part.

According to an embodiment the annular groove comprises, at a distance from the longitudinal groove, a limiting wall extended in the axial direction of the receiver, as far as which the projection can be rotated. Reaching the limiter indicates to the user that the bayonet connection has been established.

According to an embodiment, the annular groove is connected, at a distance from the longitudinal groove, to a longitudinal groove portion extending parallel thereto, which ends at a distance from the aperture. By engaging the projection into the longitudinal groove portion the reliability of the bayonet connection is effected.

According to an embodiment, the annular groove has a limiting wall extending in a ramp-like manner, of which the distance from the aperture increases with increasing distance from the longitudinal groove. The ramp-like path of the limiting wall facilitates finding the connection position and the separation of the displacement device from the drive device.

According to an embodiment the longitudinal groove, the annular groove and optionally the longitudinal groove portion are constructed in a cylindrical coupling piece which forms the receiver of the drive device and is fastened therein. As a result the manufacture, assembly and disassembly are facilitated.

According to an embodiment the drive device comprises a spring which presses against the displacement device connected to the drive device via the bayonet connection. As a result the bayonet connection is secured.

According to an embodiment, the spring is arranged on a further aperture of the receiver which is positioned opposite the aperture for axially inserting the displacement device. The displacement device and the spring act upon one another through this aperture. According to a further embodiment, the spring is a coil spring which is supported on an inner front face of the coupling piece.

According to an embodiment the longitudinal groove and/or the annular groove and/or the longitudinal groove portion are opened toward the further aperture.

According to an embodiment, the displacement device is a piston-cylinder-unit with a cylinder and a piston displaceable therein and the piston comprises the displaceable limiter. Other displacement devices are also included in the invention, for example a displacement chamber with a resilient wall forming the displaceable limiter. A piston-cylinder-unit is, for example actuated by a linear drive device. A corresponding actuation is possible with a displacement chamber with a resilient wall. The latter can also however be controlled via a drive device with a three-dimensional drive motion. Thus it is possible, for example, to control the resilient wall externally by acting upon a hydraulic or pneumatic pressure means.

According to an embodiment the attachment is aligned coaxially to the longitudinal axis of the bayonet connection. According to a further embodiment the attachment is rigidly connected to the displacement device.

According to an embodiment the pipetting device has an ejection device for ejecting a pipette tip from the attachment which comprises an ejection drive arranged on the drive device, a throw-off device arranged on the displacement device and a releasable axial clamping connection between the ejection drive and the throw-off device oriented in the direction of the longitudinal axis of the bayonet connection. The clamping connection can be established at the same time as the creation of the bayonet connection at the stage of the displacement device and the drive device being axially pushed together and can be released in the reverse direction.

According to an embodiment the ejection drive comprises an ejection rod protruding from the drive device parallel to the bayonet connection and the throw-off device comprises an axial bore parallel to the attachment and with which the ejection rod has an interference fit.

According to an embodiment, the throw-off device is carried on the displacement device.

According to an embodiment, the throw-off device is a sleeve carried on the displacement device.

According to an embodiment, the pipetting device is a hand-held device and/or a stationary device and/or an electrically driven device and/or a (semi) automatic machine. In the embodiments as a hand-held device the pipetting device is manually taken to the point where samples are taken and dispensed and the suctioning and dispensing of liquid and the actuation of the ejection device controlled manually. The drive devices for the displacement device and/or the throw-off device are of mechanical and/or electromechanical design. The latter also applies to the design of the pipetting devices as stationary devices. When designing the pipetting device as a (semi) automatic machine all functions or a portion of the functions of the pipetting devices (suctioning and dispensing liquid, movement of the pipetting devices into positions for receiving and dispensing liquid or pipette tips, receiving and dispensing of pipette tips) are carried out automatically.

According to an embodiment, the pipetting device comprises a row of parallel attachments to receive pipette tips. In this case it is a multi-channel pipetting system. A special or common displacement device is associated with each attachment of the pipetting device which is connected to the drive device via a bayonet connection. In addition, there can be a common drive device for all the displacement devices.

BRIEF DESCRIPTION OF THE SEVERAL VIEWS OF THE DRAWINGS

The invention will be described in more detail hereinafter with reference to the accompanying drawings of embodiments, in which.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The terms 'above', 'below', 'horizontally' and 'vertically' refer to the alignment of the pipetting device according to the drawings. In this connection it refers to an alignment of the pipetting device in which the pipette tip is arranged with its tip orifice below, in order to draw in liquid from a container located below the pipetting device and to dispense it into such a container.

Figure 1:
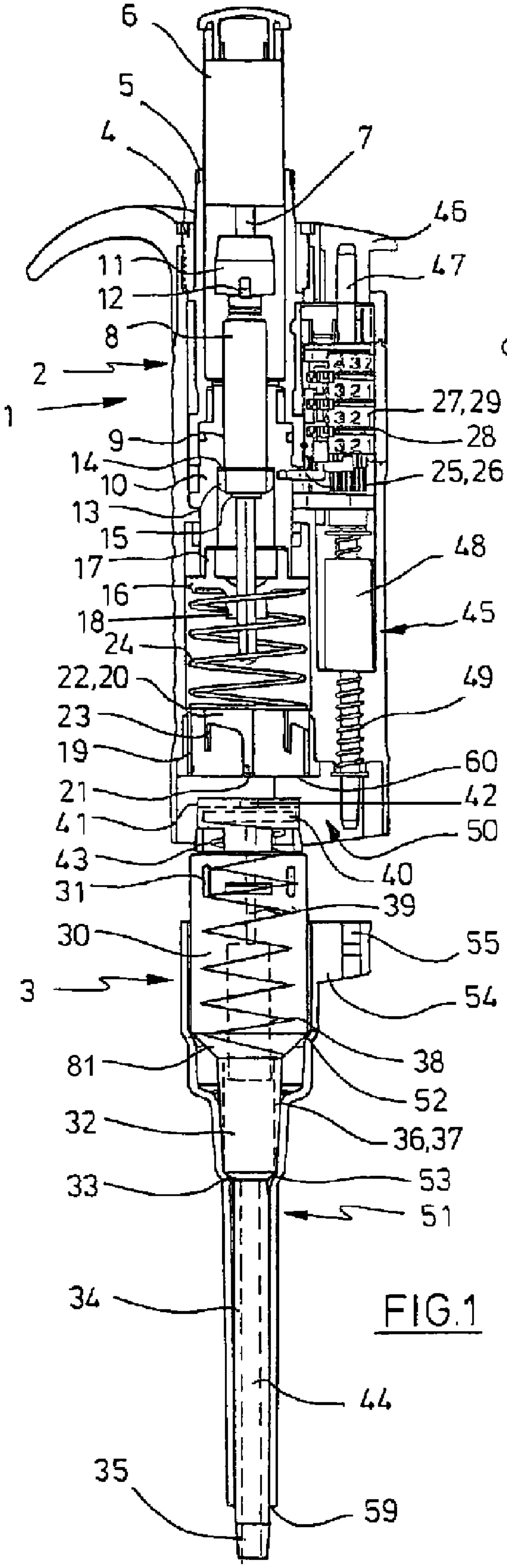
FIG. 1 is a hand-operated pipetting device with separate piston-cylinder-unit and throw-off device in longitudinal section.
Figure 2:
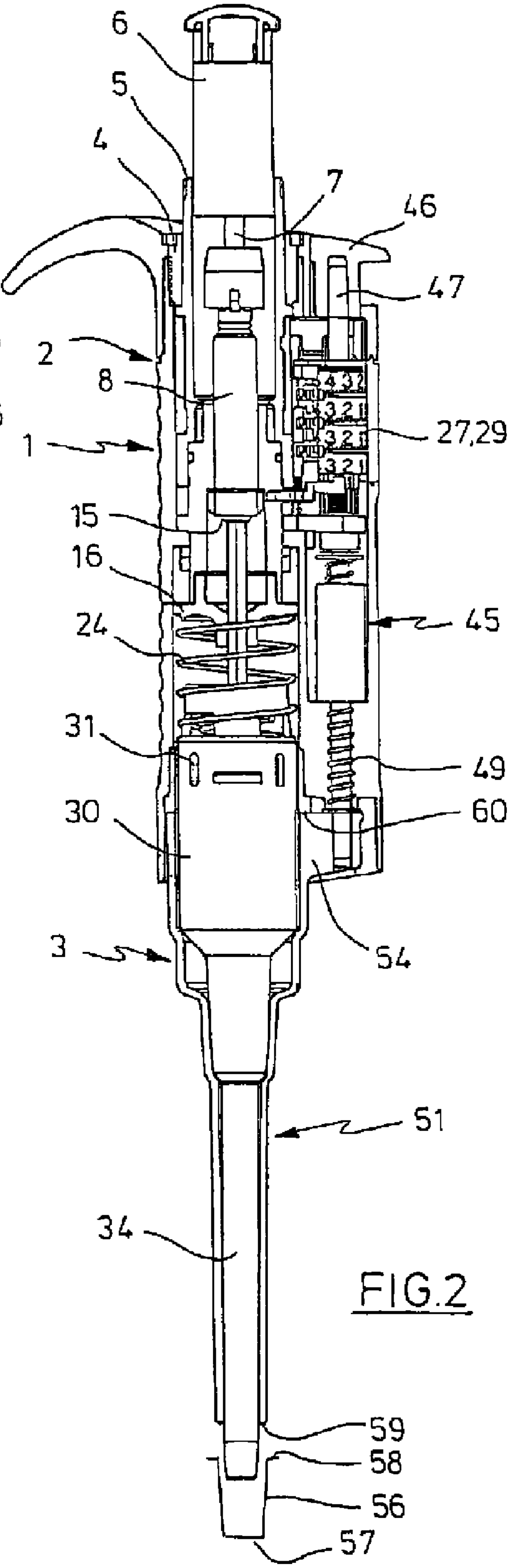
FIG. 2 is the same pipetting device with attached piston-cylinder-unit and throw-off device in longitudinal section.

The pipetting device according to FIGS. 1 and 2 has an elongate housing 1 formed as a grip with a housing upper part 2 and a housing lower part 3. The housing upper part 2 with all the parts contained therein forms a drive device and the housing lower part 3 with all the parts contained therein forms a displacement device. The housing upper part 2 has a screw cap 4 above. An adjustable sleeve 5 protrudes upwardly therefrom. The adjustable sleeve 5 is axially fixedly and rotatably mounted in the housing upper part 2.

In the adjustable sleeve 5 a push button 6 is arranged which protrudes even further upwardly.

The push button 6 is connected to a lifting rod 7 through which a spindle 8 is passed in the housing upper part 2. The spindle 8 is screwed into an internal thread 9 of a bearing body 10 fixed in the housing upper part 2.

Above, the spindle 8 comprises a tappet 11 connected rotationally fixedly thereto. The tappet 11 has on the periphery two diametrically opposing radial projections 12. The radial projections 12 engage in axially extending grooves—not shown—of the adjustable sleeve 5.

Below, the spindle 8 has an end stop 13 in the form of radially outwardly protruding ribs. In the position shown, the end stop 13 is located a small distance below a shoulder 14 of the bearing body 10, with which it cooperates.

The lifting rod 7 has a flange 15 which bears against the spindle 8 below in the position shown.

At the lower end of the bearing body 10 a spring retainer 16 is arranged, which engages in the bearing body 10 with a collar 17. Below, the spring retainer 16 has an axially protruding sleeve-shaped bearing portion 18 through which the lifting rod 7 is passed.

Moreover, the pipetting device comprises a spring, not shown, which presses the lifting rod 7 upwardly, so that the flange 15 bears against the lower face of the spindle 8. For example, a coil spring is arranged between the flange 15 and the spring retainer 16.

At a distance below the spring retainer 16 a coupling piece 19 is fastened in the housing. This has a plurality of pockets 20 inside. These have a longitudinal groove 21 extended axially over the entire length of the coupling piece 19. Moreover, they have on the upper end of the coupling piece 19 an annular groove 22 extended over a small part of the periphery of the coupling piece 19. Below, it has a limiting wall extending in a ramp-like manner at a distance from the upper end of the coupling piece 19, which from the longitudinal groove 21 increasingly approaches the upper end of the coupling piece 19. Finally, the pockets 20 have at the other end of the annular groove 22 a short axial longitudinal groove portion 23 which ends at a distance from the upper end of the coupling piece 19 in the coupling piece 19.

Between the spring retainer 16 and the coupling piece 19 a spring 24 is arranged under preload which is designed as a coil spring.

The adjustable sleeve 5 has on its periphery a sprocket 25 which cooperates with a gear 26 which drives a counter 27 with a plurality of counter wheels 29 arranged over one another on an axis 28. The counter wheels 29 are respectively numbered from 0 to 9. The lower counter wheel 29 is driven by the gear wheel 26. The counter wheels 29 arranged thereover are respectively rotated further by a number when the counter wheel 29 arranged thereunder moves from 9 to 0.

The housing lower part 3 can be releasably connected to the housing upper part 2. To this end the housing lower part 3 comprises on the casing of an upper, cylindrical portion 30 a plurality of outwardly protruding projections or ribs 31 which extend in the axial direction of the cylindrical portion 30.

The housing lower part 3 has a plurality of conical portions 81, 32 and 33 of varying lengths and taper below the cylindrical portion 30 which are revealed in the drawings. The conical portion 33 is connected below to a long, slightly conical attachment 34 for mounting a pipette tip. This again has a short, more conical mounting end 35 below.

The housing lower part 3 houses a displacement device in the form of a piston-cylinder-unit 36. This has a cylinder 37 arranged in the conical portion 32 and in which a piston 38 dips. The piston 38 is connected above to a pressure piece 40 via a piston rod 39. The piston 38 forms a displaceable limiter of the cylinder 37.

Above the pressure piece 40 the housing lower part 3 has a piston holder 41 which spans the cylindrical portion 30 above. The piston holder 41 has a central through passage 42 above, through which a lower portion of the lifting rod 7 can be axially passed. Between the pressure piece 40 and the conical portion 31 a lift spring 43 is arranged which is designed as a coil spring. The piston 38 and the piston rod 39 are passed through the lift spring 43.

The lift spring 43 is biased and presses the pressure piece 40 against the piston holder 41, so that the piston 38 is pulled out to a maximum extent from the cylinder 37.

A connection channel 44 extends through the attachment 34 and connects the cylinder 37 with an orifice in the mounting end 35.

Moreover, the pipetting device has an ejection device 45. The ejection device 45 has an actuation button 46 in the housing upper part 2 in addition to the adjustable sleeve 5. The actuation button 46 is connected to an ejection rod 47 which extends parallel to the lifting rod 7 through the housing upper part 2.

A gear mechanism 48 is incorporated in the ejection rod 47. The gear mechanism 48 converts an axial actuation stroke of the actuation button 46 into a smaller drive stroke with increased force. Examples of suitable gear mechanisms 48 include a pull-means gear mechanism, a push-means piston gear mechanism, a push-means bellows gear mechanism and a linkage gear mechanism are disclosed in EP 0 992 288 A, hereby incorporated by reference.

The ejection rod 47 is supported in the housing upper part 2 via a further coil spring 49, so that the actuation button 46 is pressed into the shown initial position into which it can be pressed against the effect of the further coil spring 49.

The lower end of the ejection rod 47 protrudes into a receiver 50 at the lower end of the housing upper part 2.

The ejection device 45 has an ejection sleeve 51 on the housing lower part 3. This is carried on the cylindrical portion 30, the conical portion 32 and the attachment 34. Accordingly, the contour of the ejection sleeve 51 is similar to the contours of the aforementioned portions of the housing lower part 3. In this connection the ejection sleeve 51 has inner steps 52, 53 which upwardly limit the pushing up of the ejection sleeve 51, as they bear against conical portions 31, 33 of the housing lower part 3.

Moreover, the ejection sleeve 51 has a lateral projection 54 on the upper edge which comprises an axial bore 55 for pressing in the lower end of the ejection rod 47.

The pipetting device can be used in the following manner:

The housing upper part 2 and the housing lower part 3 can be connected by axially inserting and rotating the lower part 3 in the coupling piece 19. As a result, a bayonet connection is established. Then the ribs 31 are pushed into the longitudinal grooves 21, rotated through the annular grooves 22 and pushed into the short longitudinal groove portions 23. In this connection, the spring 24 presses against the upper edge of the cylindrical portion 30, whereby the housing lower part 3 is fixed in its fastening position, in which the ribs 31 bear against the lower ends of the longitudinal groove portions 23 which form a stop. Moreover, the ejection sleeve 51 with the bore 55 is pressed onto the lower region of the ejection rod 47. The housing upper part 2 and the housing lower part 3 can be disassembled in the reverse manner.

After connecting the housing upper part 2 and the housing lower part 3 the lifting rod 7 engages through the through passage 42 and bears with its lower end against the pressure piece 40.

To adjust a volume to be pipetted, the adjustable sleeve 5 is rotated until the counter 27 indicates the desired volume. When rotating the adjustable sleeve 5 the tappet 11 is rotated therewith due to the radial projections 12. As a result the spindle 8 rotates in the internal thread 9 and is displaced axially in the housing upper part 2 by driving the flange 15 and therefore the lifting rod 7. The radial projections 12 are therefore axially displaced along the grooves on the inner face of the adjustable sleeve 5. As a result, the stroke of the lifting rod 7 is altered, which can take place during actuation of the push button 6.

Moreover, on the lower end of the attachment 34 a pipette tip 56 is clamped. The pipette tip 56 has a lower tip aperture 57 for suctioning and dispensing liquid.

When mounting the pipette tip 56 on the attachment 34, the mounting force increases as it is mounted further. If the mounting force exceeds the force with which the spring 24 is biased, the attachment 34 and thus the entire housing lower part 3 is pressed upwardly against the effect of the spring 24. When the upper edge 58 of the pipette tip 56 presses the lower edge forming a stop 59 of the ejection sleeve 51, a further raising of the housing lower part 3 is prevented, as the ejection sleeve 51 bears against a limiter 60 in the receiver 50 of the housing upper part 2 above. The mounting force and thus the ejection force required for ejection are thus limited to a specific value.

For pipetting, the push button 6 is pressed down, so that the piston 38 forces air out of the cylinder 37. Then the pipette tip 56 is dipped with its lower tip orifice 57 into the liquid to be pipetted. Then, the push button 6 is released and the lifting rod 7 returns into its initial position under the action of the spring. The piston 38 also returns into its initial position under the action of the spring 43. Then the piston 38 suctions liquid through the lower tip orifice 57 into the pipette tip 56.

Afterwards, the lower tip orifice 57 of the pipetting device is aligned with a dispensing position. The liquid contained in the pipette tip 56 is dispensed by pressing in the push button 6, further dipping of the piston 38 into the cylinder 37 and pressing air out through the connection channel 44. After releasing the actuation button 6, the lifting rod 7 and the piston 38 return again to the initial position by spring force.

To eject the pipette tip 56, the actuation button 46 is pressed. As a result the ejection sleeve 51 moves downwardly and pushes the pipette tip 56 away from the attachment 34.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Pipetting device with a displacement device (36) with a displacement chamber (37) with a displaceable limiter (38), an attachment (34) for connecting to a pipette tip (56) and a connecting channel (44), the connecting channel (44) being between the displacement chamber (37) and the free end of the attachment (34), a drive device (6, 7, 8) for driving the displaceable limiter (38) of the displacement device (36) comprising a drive member (7), the drive member (7) being in releasable cooperation with the displaceable limiter (38), and a bayonet connection (19, 22, 30, 31) between the drive device (6, 7, 8) and the displacement device (36), the bayonet connection (19, 22, 30, 31) being established by creating the cooperation between the drive member (7) and the displaceable limiter (38) and the bayonet connection (19, 22, 30, 31) being released by releasing the cooperation between the drive member (7) and the displaceable limiter (38).

2. Pipetting device according to claim 1, in which the drive member (7) is a lifting rod of the drive device (6, 7, 8) displaceable parallel to the longitudinal axis of the bayonet connection and the displacement device (36) comprises a contact surface connected to the limiter (38), oriented transversely to the lifting rod (7), which is pressed by a lift spring (43) against the end of the lifting rod (7).

3. Pipetting device according to claim 2, in which the contact surface is constructed on a pressure piece (40) connected to the limiter (38) via a rod (39) and the lift spring (43) designed as a coil spring is supported at one end on the pressure piece (40) and at the other end on the displacement chamber (37).

4. Pipetting device according to claim 1, in which the drive device (6, 7, 8) has a cylindrical receiver (19) which comprises at one end an aperture, through which the cylindrical receiver (19) is externally accessible in the axial direction, which at least comprises an axially oriented longitudinal groove (21), which is connected to an annular groove (22) oriented in the peripheral direction of the cylindrical receiver (19) and in which the displacement device (36) comprises on one cylindrical portion (30) at least one projection (31) protruding outwardly, the cylindrical portion (30) in the axial direction of the cylindrical receiver (19) able to be inserted through the aperture in the receiver (19) and with the at least one projection (31) in the longitudinal groove (21) and can be rotated with the at least one projection (31) into the annular groove (22).

5. Pipetting device according to claim 4, in which the annular groove (22) at a distance from the longitudinal groove (21) comprises a limiting wall extended in the axial direction of the receiver (19) as far as which the at least one projection (31) can be rotated.

6. Pipetting device according to claim 4, in which the annular groove (22) at a distance from the longitudinal groove (21) is connected to a longitudinal groove portion (23) extending parallel thereto and which ends at a distance from the aperture.

7. Pipetting device according to claim 4, in which the annular groove (22) comprises a limiting wall extending in a ramp-like manner whose distance from the aperture increases with the increasing distance from the longitudinal groove (21).

8. Pipetting device according to claim 4, in which the longitudinal groove (21), the annular groove (22) and optionally a longitudinal groove portion (23) are constructed with a cylindrical coupling piece (19) which forms the receiver of the drive device (6, 7, 8) and is fastened therein.

9. Pipetting device according to claim 1, in which the drive device (6, 7, 8) comprises a spring (24) which presses against the displacement device (36) connected to the drive device (6, 7, 8) via the bayonet connection (19, 22, 30, 31).

10. Pipetting device according to claim 9, in which the spring (24) is arranged on a further aperture of a receiver (19), which lies opposite the aperture for axially inserting the displacement device (36).

11. Pipetting device according to claim 10, in which a longitudinal groove (21) and/or an annular groove (22) and/or a longitudinal groove portion (23) are opened toward the further aperture.

12. Pipetting device according to claim 9, in which the spring (24) is a coil spring which is supported on an inner front face of the coupling piece (19).

13. Pipetting device according to claim 1, in which the displacement device (36) comprises a piston-cylinder-unit with a cylinder (37) and a piston (38) displaceable therein and the piston (38) comprises the displaceable limiter.

14. Pipetting device according to claim 1, in which the attachment (34) is aligned coaxially to the longitudinal axis of the bayonet connection (19, 22, 30, 31).

15. Pipetting device according to claim 1, in which the attachment (34) is rigidly connected to the displacement chamber (37).

16. Pipetting device according to claim 1, with an ejection device (45) to release a pipette tip (56) from the attachment (34) which comprises an ejection drive (46, 47, 48) arranged on the drive device (6, 7, 8), a throw-off device (51) arranged on the displacement device (36) and a releasably axial clamping connection (47, 55) oriented in the direction of the longitudinal axis of the bayonet connection (19, 22, 30, 31) between the ejection drive (45) and the throw-off device (51).

17. Pipetting device according to claim 16, in which the ejection drive (45) comprises an ejection rod (47) protruding from the drive device parallel to the bayonet connection (19, 22, 30, 31) and the throw-off device (51) comprises an axial bore (55) parallel to the attachment (34) which has an interference fit with the ejection rod (47).

18. Pipetting device according to claim 17, in which the throw-off device (51) is carried on the displacement device (36).

19. Pipetting device according to claim 1, in which the throw-off device (51) is a sleeve carried on the displacement device (36).

* * * * *